(12) United States Patent
Scaman et al.

(10) Patent No.: US 6,211,907 B1
(45) Date of Patent: Apr. 3, 2001

(54) SECURE, VEHICLE MOUNTED, SURVEILLANCE SYSTEM

(76) Inventors: Robert Jeff Scaman, 561 E. James St., Highlands Ranch, CO (US) 80126; Jeffrey A. Hamilton, 6034 S. Willow Way, Englewood, CO (US) 80111

(*) Notice: Subject to any disclaimer, the term of this patent is extended or adjusted under 35 U.S.C. 154(b) by 0 days.

(21) Appl. No.: 09/327,828

(22) Filed: Jun. 8, 1999

Related U.S. Application Data

(63) Continuation-in-part of application No. 09/088,267, filed on Jun. 1, 1998.

(51) Int. Cl.[7] .................................................. H04N 7/18
(52) U.S. Cl. ........................................... 348/148; 360/5
(58) Field of Search ................................ 348/148; 360/5; H04N 7/18

(56) References Cited

U.S. PATENT DOCUMENTS

| | | |
|---|---|---|
| 1,733,783 | 10/1929 | Medina . |
| 3,349,679 | 10/1967 | Lohman, III . |
| 3,752,047 | 8/1973 | Gordon et al. . |
| 5,111,289 | 5/1992 | Lucas et al. . |
| 5,282,182 | 1/1994 | Kreuzer et al. . |
| 5,319,394 | 6/1994 | Dukek . |
| 5,406,324 | 4/1995 | Roth . |
| 5,455,625 | 10/1995 | Englander . |
| 5,570,127 | 10/1996 | Schmidt . |
| 5,638,273 * | 6/1997 | Coiner et al. ...................... 360/5 X |
| 5,731,785 * | 3/1998 | Lemelson et al. ................. 342/357 |
| 5,798,458 * | 8/1998 | Monroe ............................. 360/5 X |
| 6,037,977 * | 3/2000 | Peterson ............................ 348/148 |

* cited by examiner

*Primary Examiner*—Howard Britton
(74) *Attorney, Agent, or Firm*—Lee G. Meyer; Snell & Wilmer, LLP

(57) ABSTRACT

A novel system for gathering, analyzing and storing information for the purpose of motor vehicle theft and vandalism investigations. An on board secure vehicle mounted surveillance system, that can monitor the vehicle for brief or extended periods of time that can operate whether the vehicle is on or off, having a video camera for generating video signals of an incident proximate the vehicle, having an audio device for monitoring events proximate the vehicle, motion sensor to activate the system and lights activated by the system to illuminate the area viewed by the camera. The video signals are digitized into a synchronized data file, carrying a unique vehicle identification and a time indicator with other input data occurring on or about the vehicle such as audio recordings and the like. The file is encrypted and stored on a large capacity, code accessible device or transmitted, via a transceiver, real time to authorities and/or an off vehicle storage site. Once written, the encrypted file cannot be altered or corrupted, decrypted without the encryption key, or accessed without the access authorization code. The stored data file can be down loaded to be used as evidence.

50 Claims, 3 Drawing Sheets

SECURE, VEHICLE MOUNTED, SURVEILLANCE SYSTEM

The present application is a Continuation-in-Part of application Ser. No. 9/088,267 filed Jun. 1, 1998, for Secure, Vehicle Mounted, Incident Recording System.

BACKGROUND OF THE INVENTION

1. Field of the Invention

The parent application, which is incorporated by reference in its entirety, discloses an on-board, vehicle incident surveillance system for producing a secure, permanent record of vehicular accidents for evidentiary purposes. The instant invention is broadly directed to an on-board, vehicle surveillance system and, particularly to a system for producing a secure, permanent record of criminal activity relating to the vehicle for evidentiary purposes which may be transferred directly to an information center and/or the authorities by means of a transmission link which is preferably a satellite up/link-down/link.

2. Related Art

As concern over security increases, more locations, such as ATM's, have incorporated photographic identification equipment in order to deter thefts and other unlawful acts in the vicinity of the secure location. Such systems allow routine surveillance images of persons as they present themselves at the location which is to be protected. This has a deterrent effect, since storing of images of persons as they appear at these locations represents an unbiased eye witness account of activity. By means of timers and other devices, activities can be cross-matched to surrounding activities. In prior art systems, images are stored on video tape or other means for later processing.

While the above-referenced surveillance systems have become increasingly common at fixed locations, the use of such surveillance in a mobile application is more problematic. In recent years, authorities, taxi cabs, transit systems and the like have employed mobile video units to observe activity within the mobile unit and to deter crimes while these units are in transit. Increasingly, however, vehicle theft has become a problem. In the trucking industry, truck-jacking and cargo theft has become epidemic. Thus, not only is there a requirement for surveillance in the interior of the vehicle but also surrounding the vehicle. Further, there is a requirement for night surveillance. For example, when rigs are docked overnight for unloading in the morning, tampering and removal of items from the cargo holds is common place. With high-ticket item cargo, the undetected unloading of even a single van is a multi-million dollar loss.

Vehicle insurance carriers are continually looking for ways to reduce losses as well as the cost associated with handling claims. In our prior application we addressed the losses associated with vehicular mishaps. Each year there are over 35 million on-the-road accidents in the United States alone. There are many other vehicles including water craft, and off-road vehicles which are involved in mishaps. These can vary from one vehicle to multi-vehicle incidents. These mishaps or accidents result in property and bodily injury in the multi-billion-dollar range. In most cases, one or more of the parties are at fault and it is the requirement of law enforcement officers, insurance adjusters and the like to find credible witnesses to re-account the factual evidence, so culpability and liability may accurately be determined.

Likewise, each year theft and vandalism accounts for losses that approach those from mishaps. These are likewise insured losses that must be dealt with by insurance carriers. In many cases however the loss is caused by carelessness, or is in fact an "inside job". The insurance industry, which is responsible for investigation and replacement or coverage of the loss, spends millions of dollars in investigating such activity as well as billions of dollars in replacing or compensating for lost cargo. In many instances, it is actually the driver or persons associated with the driver who are involved in removal of the cargo. Therefore, it would be advantageous to have a system that provides day and night surveillance of a mobile vehicle, especially tractortrailer's exterior of the vehicle as well as within the cab and the cargo bay.

Since the thieves may be, in fact, in cahoots with persons closely associated with the rigs or the transportation system, there is a requirement that the recording and storage of such data be in a tamper-proof container. In this manner, even persons approaching a rig or a vehicle in order to purloin the contents could be immediately detected.

Further, monitors to detect and accurately measure certain physical phenomenon would be very useful in determining the facts surrounding a theft. The key to such a system is a non-tamperable, restricted access, large storage capacity, "always on" device. It would therefore be advantageous to have a system with limited access, stored video recording of the incident, identification of the source, and accurate time synchronization, which could be reviewed after the incident by the authorities on the scene and later by investigators, prosecutors and/or judges to witness firsthand the incident as it actually happened. Thus, a secure, on board system capable of objective, non-tamperable, unbiased evidence, would be highly beneficial in determining the exact circumstances surrounding a theft.

Additionally, it would be advantageous to have a system that would instantaneously broadcast live activity to authorities in order that a response to the crime could be dispatched to the scene in order to deter and/or prevent the crime. Thus a unit which communicates directly with an information center and/or authorities by means of, for example, a satellite up/link-down/link would be highly advantageous.

One of the primary drawbacks of prior art surveillance systems is that they are capable of being tampered with or even destroyed and therefore cannot be relied upon as credible evidence, especially in a court of law. One of the primary requisites of a secure system is an encoded access system, and preferably encoding of the recorded information itself. This is necessary if the information is stored onboard or transmitted to a secure downlink for retention. Another failure of prior art systems is lack of external synchronization so that the exact time is accurately embedded into the secure coded information such that information taken from more than one vehicle can be compared on a synchronized basis.

The use of a vehicle mounted, video camera to make video records of an incident or scene external to the vehicle are known in the art. Grist, in U.S. Pat. No. 2,148,119, discloses the use of a camera mounted inside a law enforcement vehicle, which makes a record on photographic film. A speedometer mounted on the hood of the law enforcement vehicle is simultaneously recorded on the photographic film along with the target vehicle.

Lucas et al, in U.S. Pat. No. 5,111,289, discloses a system for law enforcement surveillance work. U.S. Pat. No. 1,733,783 discloses the concept of having a camera system inside a vehicle to record unauthorized use of a vehicle and to photograph scenes of an accident in which the vehicle is involved. U.S. Pat. No. 5,455,625 discloses placing a video camera inside a vehicle for recording and at the same time protecting access to the camera. U.S. Pat. No. 5,406,324 discloses a surveillance system for transmitting images via a radio transmitter. The remote transmitter transmits electrical radio signals having converted visual images to a receiver for converting visual images into an electrical signal. U.S. Pat. No. 3,752,048 discloses a surveillance camera for a vehicle that is in a tamper proof container for recording passengers. U.S. Pat. No. 5,282,182 issued to Kreuzer, et al., discloses a portable mini-cam or palm recorder which is adapted to fit into a receptacle within a passenger compartment of a vehicle to observe activity within the passenger compartment. The receptacle is designed to prevent theft of the mini-cam.

SUMMARY OF THE INVENTION

The invention broadly contemplates a novel system for gathering and storing and/or transmitting information for the purpose of motor vehicle theft and vandalism investigations and deterrence. The system of this invention is capable of monitoring the interior and the exterior of a vehicle, for brief or extended periods of time, to detect and record incidents of vandalism, theft of the vehicle and/or its contents. In one embodiment the evidence is stored in a secure, tamper-proof safe on-board box that will be accessible only by law enforcement and/or other authorized persons. In a preferred embodiment the information is transmitted directly to authorities for real time intervention. In a further embodiment the information is transmitted from the storage receptacle on command either received or preprogrammed. The system is also able to monitor both external and internal unauthorized incidents pertaining to a vehicle. The system of the instant invention is meant as a deterrent as well, in that thieves who are aware of its use will be dissuaded from criminal activity involving the particular vehicle equipped with the invention. The system of the instant invention is meant to provide intervention surveillance capability. In one embodiment the information is broadcast real time. In another aspect the stored, encoded information is transmitted for evidentiary storage separate from the vehicle. This aspect is important in incidents of hijacking.

In accordance with the broad aspect of the invention, the system includes means for monitoring and recording both external and internal incidents. The system provides video, audio and other pertinent evidence of circumstances, leading up to and including, actual vehicle thefts and/or vandalism as well as the events that immediately follow. This invention provides a new and more efficient method of investigating vehicular theft and vandalism incidents by law enforcement agencies and insurance companies. The device can be "ever-on" or "instant-on" when activated by a triggering event such as motion on or around the vehicle.

An on board, secure vehicle mounted surveillance system, capable of being activated whether the vehicle is running or is off, having at least one video camera for generating video signals of an incident internal and/or external to the vehicle is provided. In a preferred embodiment the system employs at least one video camera for generating video signals of an incident internal to the vehicle and one video camera for generating video signals of an incident external to the vehicle. Preferably, video capability includes infra-red for unlighted night surveillance. The system is preferably powered by a battery system when the vehicle is not powered, allowing the system to be operable at all times. When the vehicle is powered, the system may run directly off the vehicle's electrical system. The camera located external the vehicle, is positioned to view any incident occurring proximate the vehicle. The exterior viewing camera of the instant invention can also be mounted internal the vehicle and preferably is an infrared wide angled lens that captures a wide angle in front of the vehicle. The system may be activated by a motion sensor/detector and may contain lights, external and internal the vehicle, capable of being activated by the motion sensor/detector. The on board vehicle mounted surveillance system will preferably be capable of receiving audio data in addition to the video data.

In accordance with one aspect of the invention, an analogue video and/or audio signal is generated and stored on a large capacity, code accessible device. In a preferred embodiment, the signal is digitized into a synchronized data file, carrying a unique vehicle identification and a time indicator. The digitized data is stored on a large capacity hard disk and/or solid state storage which prevent data from being overwritten for very extended periods of time. Access to the device is controlled by a systems controller. Once written, the encrypted file cannot be altered or corrupted, decrypted without the encryption key or accessed without the access authorization code. A limited access interface accepts the "access authorization code" and allows the encrypted superimposed digitized stored data file to be externally down loaded. The decrypting key can then be used to decrypt the data thus, providing a secure chain of title for evidentiary purposes.

In a preferred embodiment, the present invention employs a device and method for sending, storing and retrieving surveillance-based information from even remote locations by use of a transceiver unit which communicates directly with an information center and/or the authorities by means of a wireless link such as a satellite up/link-down/link. The invention employs an apparatus for receiving transmitted signals, storing them in memory and subsequently recalling them from memory, and transmitting encrypted authenticated surveillance data, wherein both said reception and transmission is preferably by means of a satellite up/link and down/link.

The invention employs distinct, components which cooperate to allow the surveillance device unfettered mobility while transmitting surveillance information and data. In accordance with the invention, a transceiver means, capable of transmitting surveillance information and receiving system signals communicates with an information system which organizes the information into a compact and secure format, while allowing real time access to dispatch interactive response. The transceiver can be linked to a wireless ground station to transfer encrypted surveillance information and encrypted commands between the information center and the on board transceiver by way of the communication system. In accordance with a preferred embodiment, the instant invention utilizes a satellite communication link. As used herein a satellite link means a system capable of communications up/link-down/link without "dead spots" or loss of signal over a wide area.

The instant invention provides an on board, secure vehicle external and/or internal mounted surveillance system having means for real time, high speed data transfer between a video camera and/or an audio microphone, and/or one or more information gathering means, a system controller and a data recorder via intelligent serial communications interfaces to provide a permanent, unalterable, unedited, encrypted video record. Provided in one aspect is a secure vehicle mounted surveillance system in which the information recorded on the video sequence is unalterable and includes the time, date, vehicle identification number and audio track. The preferred on board, secure vehicle mounted surveillance system also includes an audio recording means synchronized with the video recording. In accordance with one aspect, motion sensor/detector means are provided to activate the system which is preferably of an "instant on" type. In one embodiment, lights external and/or internal to the vehicle are activated when the system is activated. In another embodiment the external lights will only activate in dimly illuminated surroundings. In a preferred embodiment, means are provided for generating synchronized superimposed signals on the video frame conveying the time and date of the incident and the vehicle identification number. The secure, vehicle mounted surveillance system of the instant invention has a plurality of microprocessors operating in a real time multi-task "master/slave" configuration.

In one embodiment, the encrypted, superimposed, digitized data file is decrypted internally within the system using the decryption key, to allow police officers, on-sight viewing of the restored information. In another embodiment the encrypted, superimposed digitized video data file can be optically transmitted, such as by a LED, from the system to a receiver. In another embodiment the encrypted, superimposed digitized video data file is transmitted real time and/or from stored files by wireless transmission to authorities or to an off vehicle storage site. Preferably the transmission link is a satellite up link down link system.

A system controller integrates the operation of the video recorder, the transducers, the digitizing buffer, the encoder and the storage as well as the secure access to the data. The system controller has a real time clock generating at least the date and time. Display block generation means disposed between the video camera and the encrypted storage for generating a display block superimposed on the video signals, generated by the video camera is provided. Likewise means are provided for super imposing the audio track on the video frame. The system controller is real time accessed to update the real time clock and program additional data into the display block means, such as the vehicle ID. The display block displays digitized transducer readouts such as the date, the time and the vehicle ID. The system also has means for periodically interrogating the transducer readouts, to update the files as a function of elapsed time.

In a preferred embodiment of the on board, secure vehicle mounted surveillance system, the video cameras and audio capturing device are mounted around the exterior of a vehicle. Some or all of these devices may be hidden in for example, mirrors or doors of the vehicle. All data gathered from the system will be stored into a secure safe box mounted somewhere on the vehicle where it is accessible only by the police or other authorized person.

In accordance with the invention, when the vehicle is not powered, the apparatus or device may be energized by a battery system and capable of reacting to a motion sensor/detector. When the vehicle is powered, the system can run off the vehicle's own electrical system. This allows for the system to operate at any time necessary or around the clock. Thus, in accordance with the invention, upon the happening of a vehicular theft, vandalism or incident, the evidence relating to that theft or incident is securely maintained until downloaded by authorized personnel and/or transmitted in response to a programed or off vehicle received transmitted command. There is no possibility of tampering with the evidence subsequent to the incident occurring.

In another aspect, each individual vehicle receives a unique identification code, such as the VIN number or the license number, which uniquely identifies the vehicle from which the information was obtained. In a preferred embodiment the identification number is displayed along with the sensor date simultaneously with the display of the video image.

The method of the invention involves activating an on board, secure vehicle mounted surveillance system having at least one video camera for generating video signals of an incident external and proximate the vehicle; generating a video signal of an incident external and proximate the vehicle; storing said video signal of an incident external and proximate the vehicle on a large capacity, code accessible device; and accessing the stored video signal by means of the access code. In a preferred method, the system employs at least one additional video camera internal the vehicle to record incidents internal the vehicle. In a preferred method, the system employs at least one device to monitor and record audio signals internal and/or external the vehicle. In another preferred method, the signal is digitized into a synchronized data file, carrying a unique vehicle identification and a time indicator. In a preferred method, a display block superimposed on the video signals, generated by the video camera is provided, as well as imposing the audio track on the video frame. The display block displays digitized transducer readouts such as the date, the time, and the vehicle ID. The method includes providing means for periodically interrogating the transducer readouts, to update the files as a function of elapsed time. The digitized data is stored on a solid state storage means, preferably a large capacity hard drive, which prevents data from being overwritten for very extended periods of time. In accordance with a preferred method the digitized data is transmitted to an off vehicle, secure storage means and/or the authorities on a real time and/or delayed time basis.

DESCRIPTION OF PREFERRED EMBODIMENT

Figure 1:
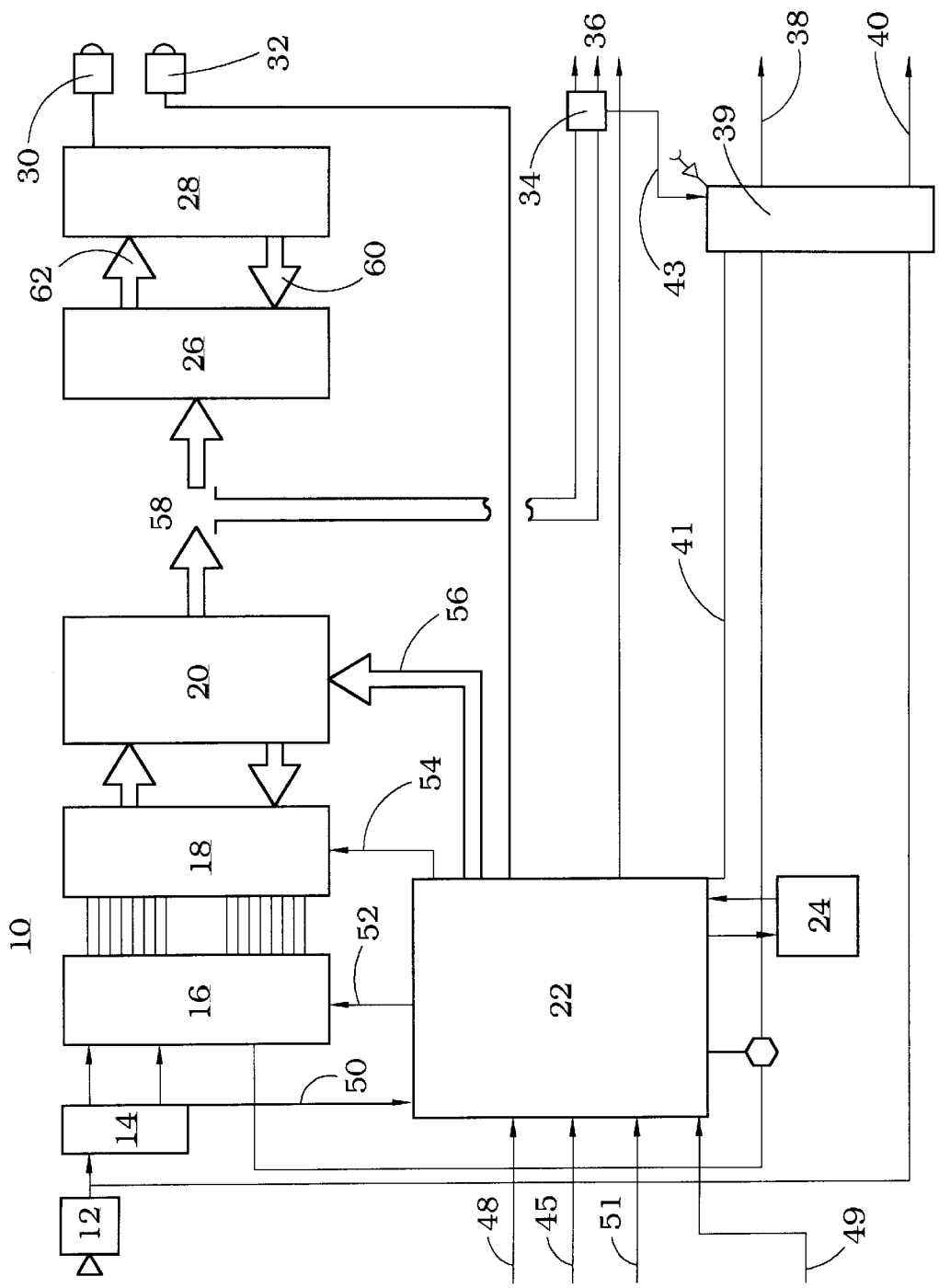
FIG. 1 is a schematic of one embodiment of the instant invention.
Figure 2:
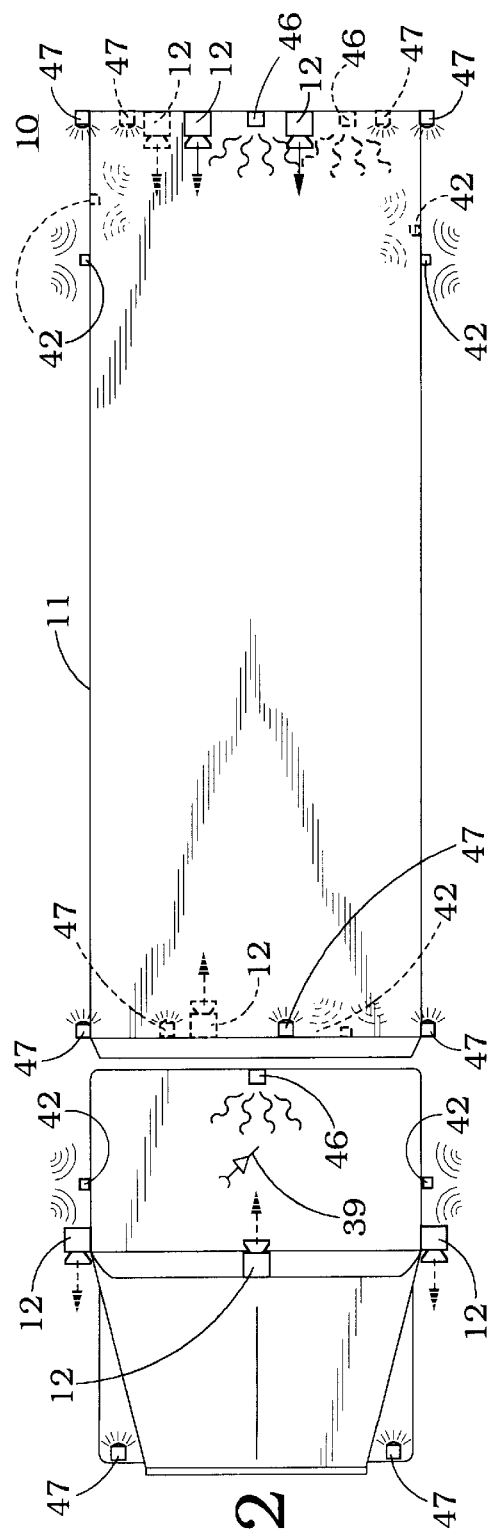
FIG. 2 is a top view of the component location in accordance with one embodiment of the instant invention.

The on board, secure vehicle mounted surveillance system 10 is shown in FIG. 1 which is a schematic only and does not bear relationship to the components within a vehicle. FIG. 1 is a block diagram of the secure vehicle mounted surveillance system 10. The on board, secure vehicle mounted surveillance system 10 is preferably mounted internal the vehicle in a remote non-access able location (not shown). A video camera 12, such as Model No. TK 900U manufactured by JVC, is mounted external to the vehicle and is pointed in a forward direction and/or is mounted internally and pointed in a forward or aft direction as seen in FIG. 2. The video camera may be hidden on for example, the vehicle's mirror or doors. The dimensions of this video camera are 2 inches×2 inches×2.4 inches. The video camera 12 is provided with a wide angle, infra-red lens, with a motorized iris to increase the operating light range of the video camera 12. Preferably, like video cameras are mounted internal and external the vehicle in strategic locations to provide internal and external surveillance views in a similar manner. The camera employed should have a minimum resolution of, for example, 300×200 pixels. Each camera exterior and interior is black and white or preferably color, has infra-red capabilities and preferably runs up to 30 frames per second. The video camera 12 preferably employs CCD such that night vision by infrared optics is improved.

The video signals generated by the video camera 12 are converted to digital format and synchronized, as explained below, and stored on hard drive 34 mounted in a sealed vault or repository somewhere on the vehicle (not shown). A video monitor can be connected to video camera 12 by means of a video online link 40, to display the scene or incident currently being photographed by the video camera 12 through a monitor and/or transmit the image to an off vehicle site through transceiver 39.

The hard disk storage is preferred for large capacity. Any configured hard disk device can be used for example, a Seagate UDMA 8.6 GB hard drive. Additionally tape drive storage can be used either as primary or backup. The storage medium can be analog or digital. For example, an endless tape loop or other storage medium could be used. Video storage can be VCR type with endless loop characteristics, re-writeable CD ROM, computer hard drive with computer compression of video. This allows upgrading as new storage media types are produced.

The hard drive 34 which has the capacity to store the information for 48 hours or more, records the digitized, encrypted output of the video camera 12. The hard drive 34 is controlled by the system controller 22 to activate the hard drive 34 play back recorded information, find referenced events, decode the stored information and the like. This permits authorities remotely and/or at the scene of a vehicle theft or vandalism to be in full control of the hard drive 34 in the vehicle so that they may view information on sight or off site and monitor current or any previously recorded incident. Preferably, the system controller 22 prohibits recording over a previously recorded portion of the data, prior to the drive space being released to the system. In this manner a permanent, non-corrupted record is retained. The system controller 22 remembers the point on the disk where the prior recording was terminated and will index to that point on the disk, prior to the resumption of recording, in response to the activating of the on board, secure vehicle mounted surveillance system 10.

The analogue output of video camera 12 is fed to input buffer 14 and video online link 40 simultaneously. Video online link 40 is hooked to an online monitor and provides real time remote access by means of transceiver 39 and/or a standard video tape that is cooperative with the camera and preferably has no storage capability. Such a link can be used to connect on site security such as at a warehouse or relay incidents real time to authorities.

Input buffer 14, converts the video camera 12 analogue signal to digital and the serial signal to parallel in order to provide storage and encoding of the digitized signal. The resulting data is a parallel signal, digitized for color and luminance. Simultaneously, the video signal is conveyed via link 50 to the system controller 22, wherein a time sequencing signal from master clock 24 is added. A programmable integrated circuit, programmed to count second time and also checks sync pulse to WWV acts as a master clock 24. Master clock 24 is connected, via radio link, to WWV interface 48 which sets the master clock to Greenwich mean time (GMT) signal (WWV: radio station with time sync signals to Greenwich mean time). Along with the timing sequence, and the vehicle identification number, system controller 22 also integrates other monitoring signals such as audio recording device 42 (shown in FIG. 2), via connection 49, from MCM with the sequenced signal in communication with buffer 16 by way of connection 52.

Controller 22 is the interactive processing unit. When an impulse from motion sensor/detector 46 (shown in FIG. 2) is received via connection 45, controller 22 activates the system including, if required, the external and internal lights 47 (shown in FIG. 2) via connector 51.

In the preferred embodiment the on board, secure vehicle mounted surveillance system 10 superimposes this information on the video signals generated by the video camera 12 and integrates the audio feed. This information is synchronized and digitized along with the video signal as previously described. Specific information can be in the form of a display block, normally located near the bottom of the recorded image. The audio is digitized in a synchronous manner for playback. The specific information superimposed on video signals generated by the video camera 12 is transmitted real time through transceiver 39 to an off vehicle location site and/or permanently recorded on the hard drive 34 along with the incident recorded by the video camera 12 and becomes a permanent part of the recorded information. Interface 38 provides a digital read out of the information in buffer 16. The display block preferably contains the month, date and year in the conventional numerical format as the time in hours, minutes and seconds. The display block will also preferably contain an identification of the host vehicle, in which the on board, secure vehicle mounted surveillance system 10 is mounted, along with other pertinent data as described above.

Temporary storage 18 is a tri-state buffering system, providing temporary storage of the encoded information. A dual system for multi-camera setup, i.e. exterior and interior cameras can be provided. Temporary storage 18 has approximately 1 megabyte RAM capacity. The 1 megabyte RAM is preferably divided into 4 blocks of 256 K which facilitates the input and output for two cameras and is designed to provide for color information which requires three times the signal storage of a black and white system. System controller 22 via link 54 controls the operation of temporary storage 18.

Buffer 20 communicates with temporary storage 18 and permanent hard drive 34, controller 22 via link 56, and output driver buffer 26 via data junction 58. Code access link 32 communicates with system controller 22. Upon receipt of the encoded signal from code access link 32, system controller 22 triggers hard drive 34 to download the encrypted signal through interface 36 to external download for use by the authorities or for secure storage. Simultaneously, through signal from system controller 22, hard drive 34 uploads stored data via data junction 58 back through buffer 20 to temporary storage 18. The data is decrypted upon signal from systems controller 22 and caused to be transmitted in a decrypted state through buffer 20 via data junction 58 to output driver buffer 26 and then to buffer driver 28 which is a parallel serial converter with LED driver. Output driver buffer 26 communicates with buffer driver 28 by means of output parallel data stream 62 and input parallel data stream 60. As light is being emitted, the on board, secure vehicle mounted surveillance system 10 can cause a direct readout of decrypted system data through diode read/write head 30.

Likewise upon receipt of the encoded signal through transceiver 39, transceiver 39, through link 41, signals system controller 22 to trigger hard drive 34 to download the encrypted signal through interface 43 to external download for use by the authorities or for secure storage. The transceiver 39 is a vehicle mounted unit with electronic memory capable of storing received data. Data is transmitted and received by the transceiver 39 through standard RF modulation and demodulation techniques such as FM (frequency modulation), AM (amplitude modulation), SSB (single sideband), FSK (frequency shift keying), PSK (phase shift keying), PCM (pulse code modulation), and the like. The transceiver 39 is normally in a powered-down mode whereby the transceiver 39 receives signals into memory to trigger events such a periodic down load to secure storage. Upon the reception of user specified data, the transceiver 39 generates a signal as previously described to start the down load procedure. The transceiver 39 preferably receives and transmits at a high frequency so that the unit may function in buildings, tunnels, under bridges and the like and the required antenna is omni-directional, and compact. The transceiver 39 is a simple and rugged unit similar in size and construction to the currently available GPS units. The circuitry of the transceiver 39 is designed to be compact and energy efficient. Thus, the transceiver 39 is capable of being used for extended periods of time on the vehicle battery. The transceiver 39 can be switched between active and passive mode by reception of the appropriate code.

The satellite component (shown in FIG. 4) is preferably a constellation of satellites which provide complete communication coverage of the Earth's surface so that a vehicle can receive and transmit information from any place on the globe. A preferred embodiment is the GPS navigational system currently in the Earth's orbit wherein the information would be transmitted on the Nudet Detection System communications link L3.

In accordance with the invention, the controller 22 can be programmed to download information through transceiver 39 on a schedule. Additionally, when the surveillance system 10 is activated as further described below, a real time encoded signal from the video camera 12 and the monitor transducers is caused to be broadcast to the authorities in a manner as better shown in FIG. 4. In this manner real time, informed response from the authorities can be dispatched to the scene.

Turning to FIG. 2, there is shown the on board, secure vehicle surveillance system 10 in accordance with the instant invention. FIG. 2 shows the physical layout of the system monitoring components such as the locations of cameras 12, motion sensors/detectors 46, microphones or audio recording device 42 and lighting components 47. External video cameras 12 are mounted on the front and back sides of the vehicle 11 facing forward. An internal video camera 12 is mounted in the front interior of vehicle 11 to view events occurring inside the vehicle and/or outside the vehicle 11 through the cab windshield. Both external video camera 12 and internal video camera 12 communicate with systems controller 22 as shown in FIG. 1. Microphone or audio devices 42, mounted on the sides of the cab and the trailer of vehicle 11, communicate with systems controller 22. Motion sensors 46 are mounted on the top of the cab and the trailer of vehicle 11. The lighting components 47 are mounted along the front of the vehicle 11 facing rearward and at the exterior aft of the trailer of vehicle 11 facing forward in order to light up the vehicle and the surrounding area. Likewise, microphone or audio devices 42, mounted internal the trailer of vehicle 11, communicate with systems controller 22. Internal lighting components 47 are mounted along the front of the trailer of vehicle 11 facing rearward and at the aft of the trailer of vehicle 11 facing forward in order to light up the interior of the trailer of the vehicle 11. It will be appreciated that the exact placement of these components will vary depending on the vehicle and the trailer load.

In operation, when the vehicle 11 is not activated, a battery (not shown) energizes the system. When the vehicle 11 is running, the vehicle's 11 own electrical system energizes the system. The device may run at all times or may be activated by a motion sensor 46. The motion sensor 46 activates the lighting components 47 when necessary such as when the vehicle 11 is parked in a dark area. The cameras 12 are energized to transmit video data. Controller 22 receives information from the audio device 42. The video signal is digitized and the information synchronized with information from the audio device 42. Added to the frame are the vehicle ID, date and time. As the vehicle 11 proceeds, the information is time synchronized and digitally stored. The information is accessed, when necessary, as set forth above.

Figure 3:
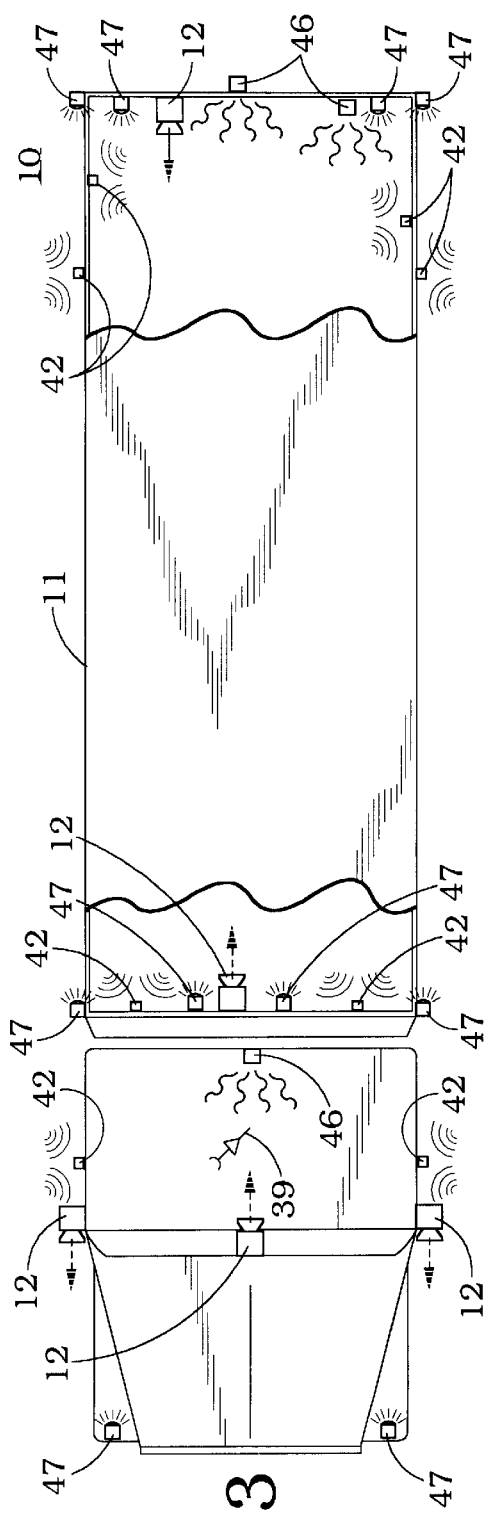
FIG. 3 is a cut away view of the top view of FIG. 2 exposing internal component location.

Turning to FIG. 3 there is shown a cut away of the vehicle 11 depicting the inside trailer portion of the vehicle 11. Depicted therein are internal video cameras 12, audio device 42, motion sensor 46 and lighting components 47, located at both the front and rear of the inside trailer portion of vehicle 11. The information is recorded and accessed in the same manner as set forth above.

Figure 4:
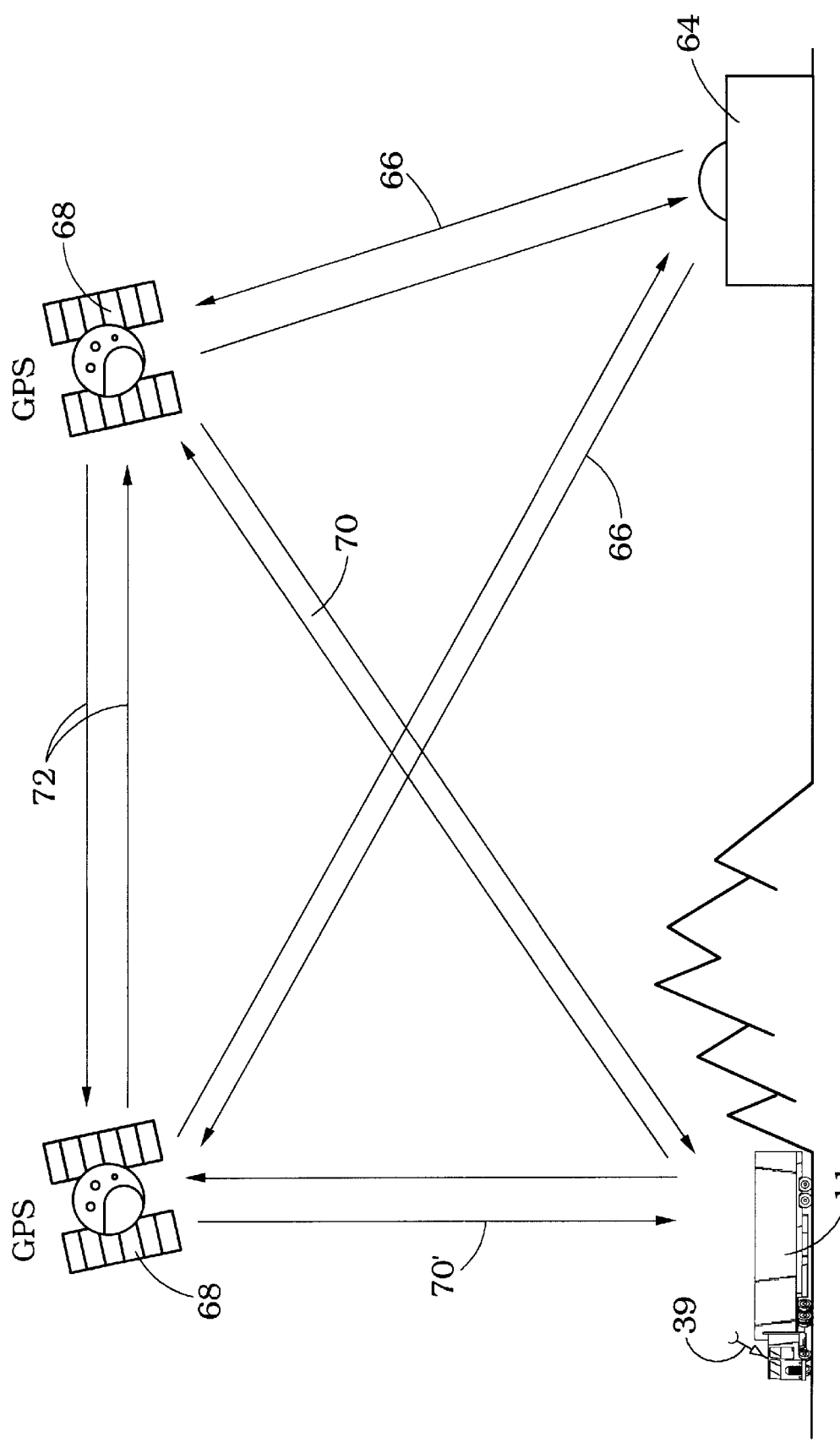
FIG. 4 is a conceptual diagram of the system of the instant invention using a GPS up/link down/link system.

Referring to FIG. 4, there is shown the relationship between the GPS satellite system, the transceiver 39 on the vehicle 11 and the transceiver 64 can be seen. To inject information into the system, transceiver 64 up/links by mimicking the L3 link by transmitting a signal 66 in the VHF/UHF band to the nearest satellite 68 in view. The signal 66 is an anti-jam, frequency-hopped transmission. Upon reception the satellite 68 dehops and demodulates the signal 66, reformats and remodulates the signal 66 and then transmits the signal 70 on the L3 link at 1381.05 MHZ. The satellite also retransmits the signal 72 on a cross-link to other GPS satellites in order to effect global coverage. Cross linked transmission signals 72 are down linked on L3 as well. Although the L3 link on the GPS navigation satellite system is contemplated as the best mode for communication between the transceiver 39 and the authorities, other satellite systems are also anticipated as functioning in place of the GPS satellites 68, with the transceiver 64 suitably modified.

It will be realized that other information may be gathered, encoded and stored in the synchronized data system. For example, GPS tracking data or the like. In this manner hijacked vehicles can be tracked down and recovered.

Having described the on board secure vehicle mounted surveillance system and how it operates, it is not intended that the on board, secure vehicle mounted surveillance system be limited to the embodiment shown in the drawings and described in the specification. It is well known that those skilled in the art may modify or make changes to the disclosed on board secure vehicle mounted surveillance system within the spirit of the invention as described herein and set forth in the claims.

What is claimed is:

1. An on board secure vehicle mounted surveillance system comprising:
   a) at least one video camera monitoring the interior and the exterior of the vehicle and for generating video signals of an incident proximate the vehicle;
   b) a recording device for capturing and securely storing said video signals having a coded access;
   c) a code for providing coded access to said recording device;
   d) means for down loading said video signal from said coded access recording device.

2. The system of claim 1 wherein said at least one video camera for generating video signals is at least two video cameras.

3. The system of claim 2 wherein said at least two video cameras comprise at least one interior looking video camera and at least one exterior looking video camera.

4. The system of claim 1 wherein said at least one video camera for generating video signals is mounted on the exterior of said vehicle and positioned to view said incidents occurring outside the said vehicle.

5. The system of claim 1 wherein said at least one video camera for generating video signals is mounted interior said vehicle and positioned to view said incidents occurring inside the said vehicle.

6. The system of claim 1 wherein said at least one video camera has infra-red lenses.

7. The system of claim 1 further comprising at least one lighting source for illuminating areas to be viewed by said cameras.

8. The system of claim 7 wherein said lights are placed for illuminating the interior of the vehicle.

9. The system of claim 7 wherein said lights are placed for illuminating the exterior of said vehicle.

10. The system of claim 1 further comprising at least one audio device in communication with said system for monitoring areas proximate the vehicle.

11. The system of claim 10 wherein said audio device is mounted on the vehicle to monitor the interior of said vehicle.

12. The system of claim 10 wherein said audio device is mounted on the vehicle to monitor the exterior of said vehicle.

13. The system of claim 1 further comprising at least one motion sensor in communication with said system for monitoring areas proximate the vehicle.

14. The system of claim 13 wherein said at least one motion sensor is mounted on the vehicle to monitor the exterior of said vehicle.

15. The system of claim 13 wherein said at least one motion sensor is mounted on the vehicle to monitor the interior of said vehicle.

16. The system of claim 1 wherein said video signals of an incident proximate the vehicle are digitized.

17. The system of claim 1 wherein said recording device for capturing said video signals is selected from the group consisting of video tape, a hard disk, a CD ROM and a solid state means.

18. The system of claim 1 wherein said video signals of an incident proximate to the vehicle contain monitor data selected from the group consisting of time and date, vehicle identifier and audio recording.

19. The system of claim 1 wherein said video signals of an incident proximate to the vehicle are contained in a crash proof, explosion proof repository.

20. The system of claim 1 wherein said means for down loading said video signal from said coded access recording device is an LED.

21. The system of claim 1 wherein said down loading is acomplished by a transceiver.

22. The system of claim 21 wherein said transceiver down loads said video signal in real time.

23. The system of claim 21 wherein said transceiver down loads said video signal from said coded access recording device on a programmed schedule.

24. The system of claim 21 wherein said transceiver down loads said video signals from said coded access recording device on command received by said transceiver.

25. The system of claim 21 wherein said transceiver communicates with a ground station by means of satellite system is a GPS system.

26. A method for the secure surveillance of incidents involving vehicles comprising:
 a) activating an on board secure vehicle mounted surveillance system having at least one video camera for generating video signals of an incident proximate to the vehicle;
 b) generating a video signal of an incident proximate to the vehicle;
 c) storing said video signal of an incident proximate to the vehicle on a secure large capacity, code accessible device; and
 d) accessing the stored video signal by means of the access code.

27. The method of claim 26 wherein said video signal is digitized into a synchronized data file, carrying a unique vehicle identification and a time indicator.

28. The method of claim 26 wherein said digitized data is stored on a large capacity hard drive which prevents data from being overwritten for very extended periods of time.

29. The method of claim 26 wherein said at least one video camera for generating video signals is at least two video cameras.

30. The method of claim 29 wherein said at least one video camera for generating video signals is mounted inside said vehicle and positioned to view said incidents occurring inside the said vehicle.

31. The method of claim 26 wherein said at least one video camera has infra-red lenses.

32. The method of claim 26 wherein mounted on the exterior of the said vehicle are lights.

33. A method for the secure surveillance of incidents involving vehicles comprising:
 a) activating an on board secure vehicle mounted surveillance system having at least one video camera for generating video signals of an incident proximate to the vehicle;
 b) generating a video signal of an incident proximate to the vehicle;
 c) storing said video signal of an incident proximate to the vehicle on a large capacity, code accessible device; and
 d) accessing the stored video signal by means of the access code
 wherein mounted on the exterior of said vehicle are lights and wherein said lights are facing toward the interior of said vehicle.

34. The method of claim 26 wherein lights are mounted on the interior of said vehicle.

35. The method of claim 26 wherein an audio recording device is mounted to the exterior of said vehicle.

36. The method of claim 35 wherein said audio recording device is mounted on the interior of said vehicle.

37. The method of claim 26 wherein a motion sensor is mounted to the exterior of said vehicle.

38. The method of claim 26 wherein a motion sensor is mounted to the interior of said vehicle.

39. The method of claim 26 wherein said recording device for capturing said video signals is selected from the group consisting of video tape, a hard disk, a CD ROM and a solid state means.

40. The method of claim 26 wherein said video signals of an incident external to the vehicle contain monitor data selected from the group consisting of time and date, vehicle identifier and audio recorded.

41. The method of claim 26 wherein said video signals of an incident external to the vehicle are contained in a crash proof, explosion proof repository.

42. The method of claim 26 wherein said means for down loading said video signal from said coded access recording device is an LED.

43. The method of claim 26 wherein said down loading said video signal from said coded access recording device is performed by a transceiver.

44. The method of claim 43 wherein said transceiver down loads said video signal from said coded access recording device in real time.

45. The method of claim 43 wherein said transceiver down loads said video signal from said coded access recording device on a programmed schedule.

46. The method of claim 43 wherein said transceiver down loads said video signals from said coded access recording device via a satellite system.

47. The method claim 46 wherein said satellite system is a GPS system.

48. The method of claim 43 wherein said receiver down loads said video signals from said coded access recording device by transmitting a signal to said satellite system.

49. The method of claim 43 wherein said satellite transmits said signal to an off site location.

50. The method of claim 49 wherein said satellite transmits said signal to other satellites.

* * * * *